United States Patent [19]

Pablo

[11] 4,077,703
[45] Mar. 7, 1978

[54] OPTICAL APPARATUS FOR VIEWING OBJECTS AT AN ANGLE TO THE DIRECT LINE OF VISION

[76] Inventor: Cecilia P. M. Pablo, 1822 W. Eddy, Chicago, Ill. 60657

[21] Appl. No.: 706,238

[22] Filed: Jul. 19, 1976

[51] Int. Cl.² .......................................... G02B 27/02
[52] U.S. Cl. ..................................... 350/145; 350/286
[58] Field of Search ............... 350/145, 146, 286, 72; 351/57

[56] References Cited

U.S. PATENT DOCUMENTS

| | | | |
|---|---|---|---|
| 2,123,682 | 7/1938 | Wingate | 350/145 |
| 2,594,698 | 4/1952 | Thomas | 350/145 |
| 2,618,199 | 11/1952 | Evans | 350/145 |

Primary Examiner—Paul A. Sacher

[57] ABSTRACT

Optical apparatus is disclosed for enabling a person wearing such apparatus to view objects at an angle to their direct line of vision while their gaze is fixed in a substantially direct line of vision.

The apparatus comprises prisms removably insertable into prism housings on an eye frame which can be worn in front of the eyes or over a pair of reading and/or viewing glasses.

6 Claims, 14 Drawing Figures

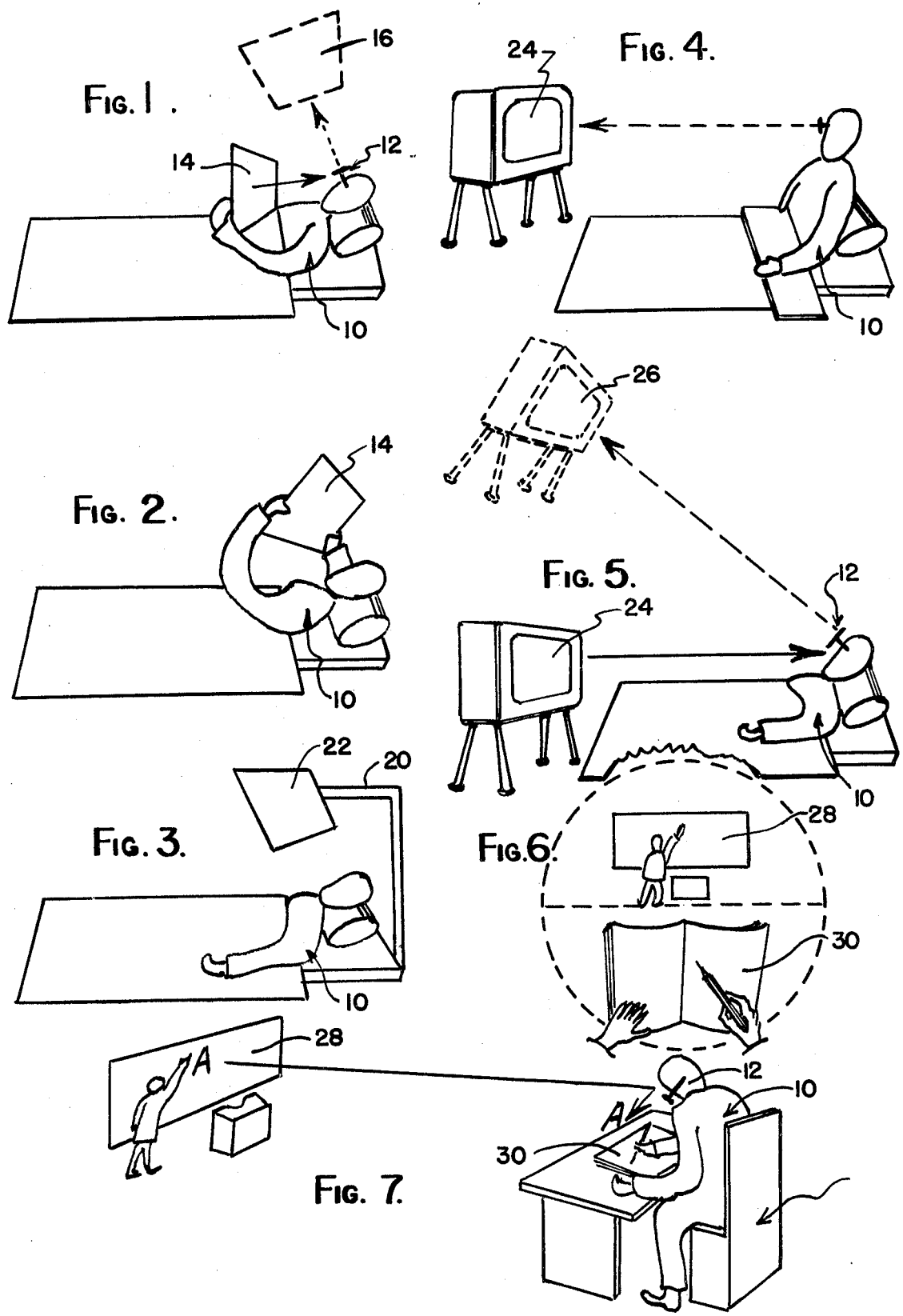

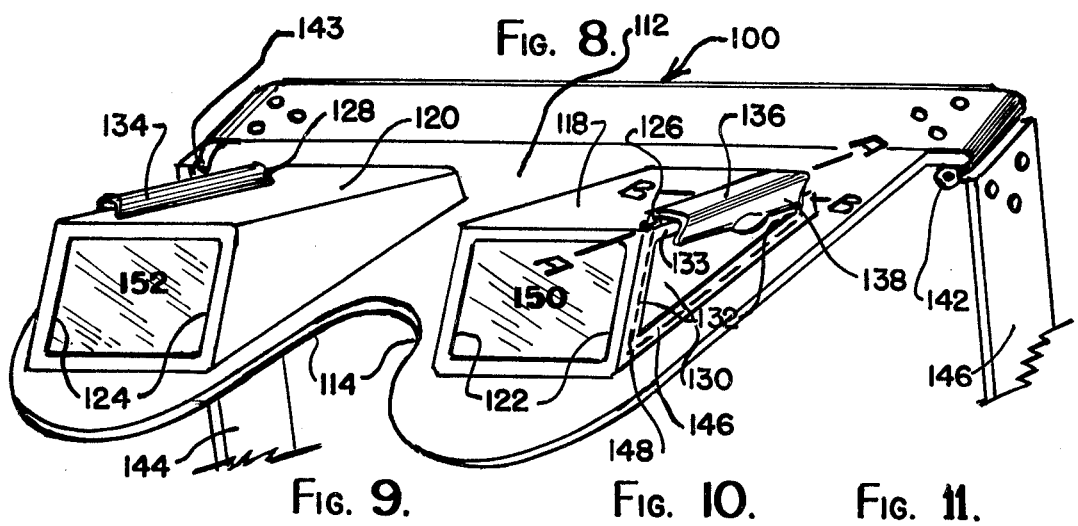
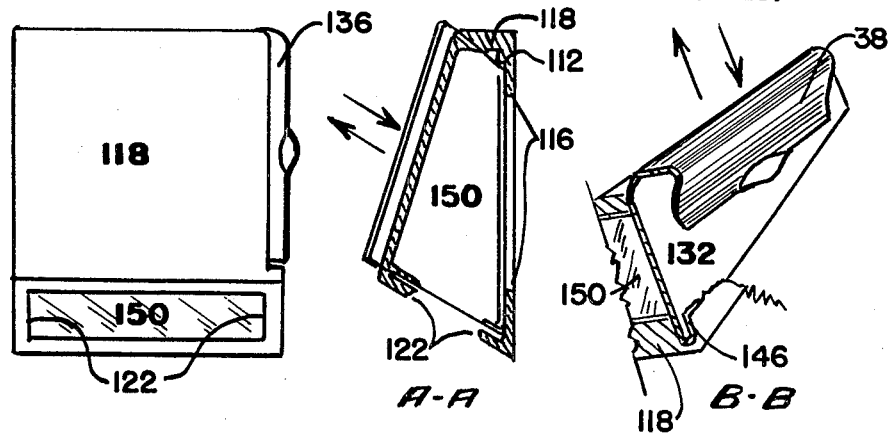
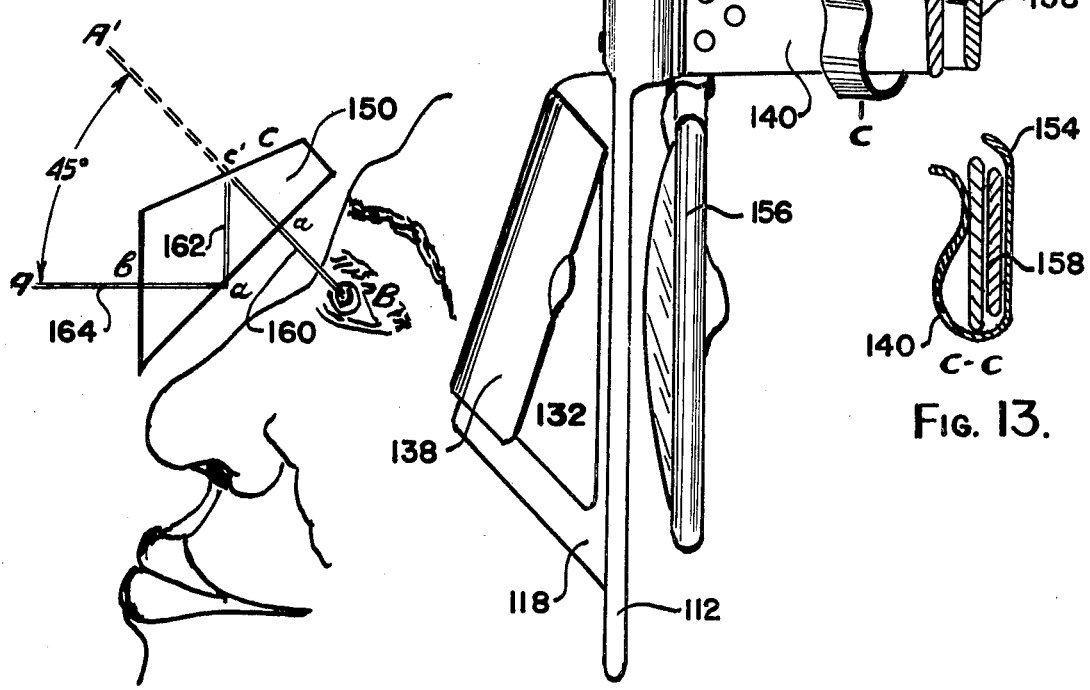

OPTICAL APPARATUS FOR VIEWING OBJECTS AT AN ANGLE TO THE DIRECT LINE OF VISION

SUMMARY OF THE INVENTION

The present invention relates to optical apparatus for enabling a person wearing such apparatus to view objects at an angle to their direct line of vision while their gaze is fixed in a substantially direct line of vision. The apparatus comprises an eye frame positionable over the eyes of a person wearing such apparatus, the eye frames having eye openings therein and a nose receiving section on the eye frame for positioning the eye frames over the bridge of the nose of the person wearing the apparatus. Prism housings are mounted on the frame over the eye openings. The prism housings are arranged for removably housing optical prisms therein, prism access openings being provided in the prism housings for removably inserting optical prisms into the prism housing. A lockable cover is provided for opening and closing the openings and for securing an optical prism in the prism housings.

In another embodiment, the prism housings comprise housings having interior dimensions substantially the same as the exterior dimension of optical prisms inserted in the prism housings. The prism housings further have an objective opening in one wall whereby an object viewed through the objective opening is directed by the prism to the direct line of vision of a person wearing the apparatus. The prism access opening is positioned in another wall of the housing other than the objective opening and lies in a first plane parallel to one wall of an optical prism inserted in the housing. A slot opening is provided in the housing lying in a second plane parallel to the first plane, the slot opening in the housing extending into slots for receiving the lockable cover, the slots for receiving the lockable cover projecting beyond the edges of the prism access openings. The lockable cover is insertable in the slot openings and the slots for receiving the lockable cover, the lockable cover also being securable in the slot openings by detent members in the lockable cover.

In further embodiments, the slot openings in the upper edge of the prism access opening are separated by a rib, the detent being positioned on the upper edge of the lockable cover and comprises a member that extends downward from the lockable cover over the rib in a resilient lipped flange, the edge of the lipped flange projecting inwardly toward the wall of the lockable cover to releasably engage the rib.

In a further embodiment, the eye frame comprises a planar member having a recessed area conforming to the outline of the bridge of a person's nose wearing the apparatus.

In yet another embodiment, ear securing arms are foldably secured to the eye frame by hinges. The ear securing arms may clip thereon for mounting the apparatus over a pair of glasses, the clips being employed to secure the arms to the arms of such glasses.

BRIEF DESCRIPTION OF THE DRAWING

FIGS. 1–7 comprise perspective views illustrating various uses for the optical apparatus of the present invention.

FIG. 8 is a partial perspective view of an optical apparatus for viewing objects at an angle to their direct line of vision while the gaze of a person wearing such apparatus is fixed in a substantially direct line of vision according to one embodiment of the present invention.

FIG. 9 comprises a plan view of a prism housing employed in the optical apparatus according to another embodiment of the present invention.

FIG. 10 comprises a side elevation in section along the line A—A of FIG. 10.

FIG. 11 comprises a partial perspective view taken along the line B—B of FIG. 8.

FIG. 12 comprises a partial side elevation of an optical apparatus for enabling a person wearing such apparatus to view objects at an angle to their direct line of vision while their gaze is fixed in a substantially direct line of vision, such optical apparatus being secured to a pair of regular glasses by means of clips.

FIG. 13 comprises a front elevation in section taken along the line C—C from FIG. 12.

FIG. 14 comprises a partial side elevation illustrating an optical prism in section employed in the optical apparatus for enabling a person wearing such apparatus to view objects at an angle to their direct line of vision while their gaze is fixed in a substantially direct line of vision according to another embodiment of the present invention.

DETAILED DESCRIPTION OF THE PREFERRED EMBODIMENT

Optical apparatus comprising eye frames having eye openings therein and prisms mounted in front of such openings are disclosed in the prior art U.S. Pat. Nos. 3,883,225 Rehm; 3,549,302 Fraige; 3,298,771 Ratliff, Jr.; 3,058,392 Primeau; 2,594,698 Thomas; 2,574,960 Courmettes; 2,123,682 Wingate and 1,610,553 Jones.

It would be desirable to provide an optical apparatus enabling a person wearing such apparatus to view objects at an angle to their direct line of vision while their gaze is fixed in a substantially direct line of vision whereby such apparatus comprises a frame having eye openings therein and prism housings over the eye openings so that the prisms may be removably inserted in the prism housings for viewing objects at different angles to a person's direct line of vision.

Such apparatus in which the prisms are easily removed for cleansing would also be desirable.

The foregoing U.S. Pat. No. 2,594,698 Thomas illustrates adjustable prisms mounted on an eyeglass frame, however, the prisms illustrated by Thomas are to keep in adjustment. Additionally, none of the prior art references noted above disclose an optical apparatus employing prisms in which the prisms are easily removed for cleaning.

It is therefore an object of the present invention to overcome these and other difficulties encountered in the prior art.

It is a further object of the invention to provide optical apparatus for enabling a person wearing such apparatus to view objects at an angle to their direct line of vision while their gaze is fixed in a substantially direct line of vision.

It is a further object of the present invention to provide such apparatus which employs prisms which are removably insertable into a housing on an eye frame so that the prisms may be changed to change the angle at which objects are viewed with respect to the direct line of vision of a person wearing such apparatus.

It is a further object of the present invention to provide such optical apparatus employing prisms removably mountable on an eye frame so that the prisms may be readily cleaned.

These and other objects have been achieved according to the present invention and will become apparent from the disclosure and claims that follow as well as the appended drawings.

Referring to the drawings, FIGS. 1 through 7 illustrates various uses for the optical apparatus of the present invention.

Specifically referring to FIG. 1, a person 10 is shown reading a newspaper 14 at an angle to the persons direct line of vision while their gaze is in a direct line of vision, the image seen by the person 10 being represented by FIG. 16. The convenience of using the optical apparatus 12 of the present invention is illustrated by the alternatives shown in FIGS. 2 and 3 whereby the person 10 in FIG. 2 would have to hold a newspaper 14 in an awkward position in order to be able to read a newspaper while in a recumbent position, or apparatus 20 could be used comprising a rack for holding reading material 22.

Referring to FIG. 4, the viewing of a television set 24 by a person in an upright position in bed is illustrated whereas such a person may be in a supine or substantially supine position as illustrated in FIG. 5 for viewing a television set 24 by means of the optical apparatus 12, the image seen by a person in FIG. 5 being represented by 26.

In another use for the optical apparatus of the present invention a person 10 viewing a blackboard 28 while his head is fixed in a downward gaze at writing materials 30 is possible by means of the optical apparatus 12 worn by the person 10 in FIG. 7. The person is able to view the blackboard 28 and the pad 30 simultaneously for taking notes from the blackboard 30. The view obtained by the person 10 in FIG. 7 is illustrated in FIG. 6 where it can be seen that not only is the notebook 30 plainly visible to the person even though their gaze is in a downward direction at notebook 30 but also the blackboard 28 can be seen even though at an angle to person 10's direct line of vision.

Referring to FIGS. 8-14, an optical apparatus 100 is illustrated for enabling a person wearing such apparatus to view objects at an angle to their line of vision while their gaze is fixed in a substantially direct line of vision. The optical apparatus 100 comprises a frame 112 and a nose opening 114 in the frame, eye opening 116 being provided in the frame 112. The nose opening 114 is provided for positioning the eye frame 112 over the bridge of a nose of the person wearing such apparatus. Prism housings 118 and 120 are mounted on the frame 112 over the eye openings such as eye opening 116, the prism housings 118 and 120 removably housing optical prisms 150 and 152 therein. Prism access opening 132 is provided in prism 118, a similar opening being provided in prism 120 however is not illustrated. The prism access opening such as access opening 132 allows for the removable insertion of optical prisms 150 and 152 into the housings 118 and 120. Lockable covers such as cover 136 and 134 are provided for opening and closing the prism access openings 132 and for securing an optical prism such as prism 150 and/or 152 in the prism housing means 118 and 120 respectively. The interior dimensions of prism housings 118 and 120 are substantially the same as the exterior dimensions of the optical prisms 150 and 152 therein. Objective openings 122 and 124 are provided in one wall of the prism housings whereby an object viewed through the objective opening is directed by the prisms 150 and 152 to the direct line of vision through the eye frame openings such as opening 116 to a person wearing such optical apparatus. The prism access opening such as opening 132 in housing 118 is positioned in another wall of the housing 118 and lies in a first plane parallel to one wall of an optical prism 150 inserted in the housing 118. The arrangement of the prism access opening in prism housing 120 is similar to that of housing 118 however is not illustrated. Slot openings 126 and 128 in housings 118 and 120 are provided and lie in a second plane parallel to the first plane, the slot opening in the housing 118 extending in slots 146 and 148 for the lockable cover 136, the slots 146 and 148 projecting beyond the edges of the prism access opening 130. Slots similar to slots 146 and 148 being provided in prism housing 120. The lockable covers 136 and 134 are insertable in the slot openings 126 and 128 respectively and are securable in the slot openings 126 and 128 by detent members in the covers 136 and 134. The slot opening 126 in the upper edge of the prism access opening 130 is separated by a rib 133. The detent member is positioned on the upper edge of cover 132 and comprises a flange 136 that extends downward over rib 133 into a resilient lip 138, the edge of lip 138 projecting inwardly towards the wall of cover 136 to releasably engage rib 133.

A pair of ear engaging members 146 and 144 are connected to the frame 112 by means of hinges 142 and 143. Clips such as clip 154 may be employed to secure the optical apparatus 100 to the ear engaging members 158 of a pair regular glasses 156. By regular glasses, it is meant spectacles or optical devices for correcting near sightedness of far sightedness as known in the art.

Referring to FIG. 14, the prism 150 is illustrated in section whereby an object "A" may be viewed at an angle AB, A° of 45° from the direction line of vision 160 of a viewer, the image of the object A passing into the prism 150 along the line 164 and being reflected upward to the upper surface of the prism 150 along path 162 after which it is seen on the direct line of vision 160 of a person having the prism positioned in front of their eye.

In use, any prisms 150 and 152 may be inserted in the prism housings 118 and 120 and the frame 112 is placed in front of the eyes of a person using the optical apparatus 100. The prisms 150 and 152 are inserted into the housings 118 and 120 by removing the covers 132 and 134. Depending on the angle with which the viewer wishes to view an object, different prisms may be employed. The prisms may also be removed from the housing 118 and 120 by taking the covers 132 and 134 out of the slots 126 and 128 and sliding the prisms out of the housings 118 and 120. Removal of the prisms from the housings 118 and 120 is easily accomplished for replacing the prisms for prisms that will change the angle of viewing of a person wearing the optical apparatus as well as for removing prisms for easy cleaning thereof.

Although the invention has been described by reference to some embodiments, it is not intended that the novel optical apparatus be limited thereby, but that modification thereof are intended to be included as falling within the broad spirit and scope of the foregoing disclosure, the following claims and the appended drawing.

I claim:

1. Optical apparatus for enabling a person wearing such apparatus to view objects at an angle to their direct line of vision while their gaze is fixed in a substantially direct line of vision comprising an eye frame positionable over the eyes of a person wearing such apparatus, said eye frame having eye openings therein, nose receiving means on said eye frame for positioning said eye frame over the bridge of the nose of a person wearing such apparatus, prism housing means mounted on said frame over eye openings for removably housing optical prisms therein, prism access openings in said prism housing means for removably inserting optical prisms into said prism housing means, lockable cover means for opening and closing said openings and for securing an optical prism in said prism housing means and a prism located in said prism housing means.

2. The optical apparatus of claim 1 where said prism housing means comprises housing having interior dimensions substantially the same as the exterior dimensions of optical prisms inserted in said housings, an objective opening being provided in one wall of said housing whereby an object viewed through said objective opening is diverted by said prism to the direct line of vision of a person wearing such apparatus, said prism access opening being positioned in another wall of said housing and lying in a first plane parallel to one wall of an optical prism inserted in said housing, a slot opening in said housing lying in a second plane parallel to said first plane, said slot opening in said housing extending in slots for receiving said lockable cover means, said slots for receiving said lockable cover means projecting beyond the edges of said prism access openings, said lockable cover means being insertable in said slot opening and said slots for receiving said lockable cover means, said lockable cover means further being securable in said slot openings by detent means in said lockable cover means.

3. The optical apparatus of claim 2 where said slot opening and the upper edge of said prism access opening are separated by a rib, said detent means being positioned on the upper edge of said lockable cover means and comprises a member that extends downward from the lockable over said rib in a resilient lipped flange, the edge of said lipped flange projecting inwardly toward the wall of said lockable cover means to releasably engage said rib.

4. The optical apparatus of claim 3 where said eye frame comprises a planar surface having a recessed area conforming to the outline of the bridge of a person's nose wearing said apparatus.

5. The optical apparatus of claim 4 further comprising ear securing arms foldably secured to said eye frame by hinges.

6. The optical apparatus of claim 5 where said ear securing arms have clips thereon for mounting said apparatus over a pair of glasses, said clips securing said arms to the arms of said glasses.

* * * * *